United States Patent Office 3,141,816
Patented July 21, 1964

3,141,816
METHOD OF IMPROVING OPERATIONAL EFFICIENCY OF WHITE WATER RECOVERY SYSTEMS
John A. Manley, Neenah, Wis., assignor to Nalco Chemical Company, Chicago, Ill., a corporation of Delaware
No Drawing. Filed July 27, 1960, Ser. No. 45,521
4 Claims. (Cl. 162—190)

This invention relates to a method for improving the operational efficiency of white water recovery systems of the type commonly used in the manufacture of fibrous products such as paper. Particularly the invention is directed to an improved method for increasing the operational efficiency of white water flotation type saveall systems.

Paper manufacturers are always trying to discover better methods for efficiently handling the processing and disposal of white waters. White waters, for purposes of this invention, are any aqueous suspensions of solid materials which result from the processing of fibrous and non-fibrous materials from an aqueous suspension to form a sheet or mat-like structure. In a standard papermaking operation, a typical furnish contains from 6.0 to 0.1% by weight of pulp as well as other dispersed or suspended ingredients such as, for instance, inorganic fillers, size such as rosin, glue, flour and the like. This aqueous slurry is passed onto a Fourdrinier wire or cylinder wire mold which retains the majority of the suspended fibrous materials and other chemicals with the excess of the water used to suspend the pulp being allowed to drain through the wire where it is collected by various types of apparatus which are commonly referred to by the paper trade as saveall systems.

The drainage entering the saveall systems will be composed substantially of water but will contain from 0.005 to 1.0% by weight of various types of organic and inorganic substances which were used in the furnish or make-up of the initial pulp slurry. This water suspension of finely divided solids in the saveall system is known as the white water. The finely divided solids contained in the saveall should be collected and returned to the paper processing stream if efficient utilization of the various materials contained therein is to be achieved.

In the past it has been common to dispose of white waters from the paper manufacturing process by discharging them into streams or sewage systems where they would ultimately find their way into various types of natural bodies of water. As paper production was increased it was soon discovered that white waters tended to be a contaminating factor. They provided a source of both organic and inorganic pollution to the water, and they tended to increase the B.O.D. (biological oxidation demand) of these natural water bodies to the extent that they became unsuitable for use as sources of potable water. This contamination also tended to destroy the marine life which often flourished in these waters.

With the development of the paper industry numerous attempts were made to improve white water recovery systems. Great advances have been made in the types and designs of white water recovery systems. As a general rule, there are three basic types of white water recovery systems. First, and perhaps the most impractical, is the settling type system in which the white waters are fed into a reservoir or settling basin where the suspended solids are allowed to gradually sink to the bottom of the basin. After a period of time has elapsed substantial settling occurs. The water is then withdrawn for either re-use or is discharged to appropriate waste disposal systems. The settled material is removed by either scraping or cleaning operations. This system not only requires large, expensive units, but is extremely inefficient. For the most part, settling type systems have been disfavored from the standpoint of efficient operation and are only used to a very limited extent.

The newer type of saveall units may be generally classified as either vacuum type systems or flotation type systems. The vacuum type system operates on a simple principle. In this system a rotary drum having a plurality of foraminous openings is employed and the paper stock as it passes over the wire is subjected to a vacuum which deposits the fibers on the wire with the water being passed through for re-use or disposal. In this type of system the suspended solids of the system are collected on the wire and are removed by scraping, dumping, or the like. The major disadvantage of the vacuum type system is that it is only practical where the drainage characteristics of the suspended solids in the white water produce a mat upon the wire that is relatively non-compact and allows good drainage to occur. For this reason, the vacuum type systems are not particularly suited to many type papermaking operations and to that extent their use is also somewhat limited.

In recent years great strides have been made in flotation type white water processing systems. The principle upon which the flotation saveall systems operate is that of continuously dissolving air under pressure into a collected quantity of white water. This produces a floatable mass consisting of fiber and other undissolved components which separate from the furnish used in the particular paper process. After the air has been dissolved under pressure into the white water the compressed mass is then released to the atmosphere, usually into a container, and as a result air bubbles are formed which carry the fiber and other suspended materials to the surface of the collecting container. After being carried to the surface of the container the suspended materials which are frequently in the form of a frothy or foamy mass are then skimmed by means of suitable mechanical skimmers and are then either returned for re-processing or are discharged to waste.

While the flotation type saveall systems proved themselves to be the most efficient from both the standpoint of equipment investment as well as operational efficiency, it has been observed that these systems are not entirely satisfactory. Although careful operational control of these systems will enable a fairly adequate treatment of white water, it has been found necessary to employ various types of chemicals in conjunction with their use. Chemicals not only improve their efficiency but also simplify the operation of these units.

In summary, it might be said that the function and primary purpose of various types of saveall systems is to save additional fiber and other suspended materials contained in the white water. Another important benefit derived from the use of saveall equipment is to improve the clarity of the treated white water by removing suspended solids thereby enabling it to be used in the various mill operations where a relatively high quality of water is required. Another purpose of efficient saveall operation is to decrease pollution loads to streams and other natural bodies of water. A further important aspect of efficient saveall operation is to decrease the number of man hours needed to operate and maintain the equipment. When chemicals are used in conjunction with saveall systems it is beneficial that they be used at a low economical dosage and that they tend to generally upgrade the efficiency of the equipment in which they are employed.

The most commonly used chemicals in the treatment of white waters to improve the operational efficiency of saveall units are various types of animal glues. Glue is said to promote the agglomeration of suspended solids in the saveall system and thereby increase the yield of suspended matter that is removed or acted upon by the system. Glue, however, has several drawbacks which makes its use in saveall systems not entirely satisfactory. In one instance, animal glues support microbiological growth which forms slimey masses in saveall systems that substantially interfere with their operation. In another aspect, glue is not satisfactory since it must be used under rather crticial pH conditions for its most efficient employment. Also, glue is not entirely satisfactory since it is difficult to make up treating solutions and they must be used in a relatively short period of time after being made up since age tends to destroy their usefulness.

In addition to using glue, other chemicals have been suggested for improving the efficiency of saveall operations. These chemicals being illustrated by such materials as activated silica, alum, sodium aluminate, and the like. Quite frequently such factors as pH, dissolved solids, retention time in the system, flow rate and the nature of the suspended solids will act to negate or substantially lessen the effectiveness of these prior art additives.

Another problem that is sometimes encountered in the use of various types of saveall systems and, in particular, flotation type saveall systems, is that while the unit is capable of removing the fibrous matter contained in the white water; it is not effective in collecting various types of fillers, size ingredients, and the like which are intimately admixed with the fibers during the paper manufacturing process.

In another aspect of the problem related to the use of chemicals in saveall systems, it has been observed that it is necessary to give consideration to the electrostatic charge on the fibers and suspended solids in the system. Due to this charge effect, it is frequently necessary to use chemicals which act by way of neutralization or by ionic type bonding effects. Thus, many chemicals which are anionic or cationic in nature must be selectively used in a particular white water system with such selection depending upon the nature of the charge on the suspended materials present.

With the several problems enumerated above, it is evident that improvement is needed in the operation of saveall systems, particularly those of the vacuum or flotation type. It is further obvious that when such systems are utilized in conjunction with various chemical additives in an attempt to improve their efficiency, that the chemical additives are not entirely satisfactory. It, therefore, becomes an object of the invention to provide a method for improving the operational efficiency of vacuum and flotation type saveall systems of the type used in treating white waters resulting from the manufacture of paper and similar fibrous substances.

Another object is to provide chemical additives which are capable of improving the operational characteristics of several types of saveall systems commonly employed in the treatment of white water in paper manufacturing operations.

An important object of the invention is to provide chemicals for the treatment of saveall systems which are not affected by pH, type of suspended solids, and other environmental conditions of the white water, and yet which will efficiently improve the recovery of suspended fibrous and other matter in white waters as well as to produce a high quality, clear effluent water which may be subsequently re-used in various stages of the paper manufacturing process.

A further object is to provide chemicals for use in conjunction with saveall units in the manufacture of paper which will not interfere with their mechanical functioning.

Still another object is to provide chemicals which will not only improve the general overall efficiency of saveall operations, but which will increase the throughput in a particular system and at the same time increase both the recovery of fines and suspended matter as well as producing a high quality water therein. Other objects will appear hereinafter.

In accordance with the invention it has been found that the operational efficiency of vacuum saveall and flotation type white water recovery systems may be substantially improved by treating the white water with a very small, yet beneficial, amount of high molecular weight water soluble ethylene oxide polymers.

The ethylene oxide polymers which are usable in the invention are a relatively new type polymer which until the last few years has been unknown commerically. The polymerization of ethylene oxide using conventional catalysts and techniques, forms a polymer which has repeating —$CH_2CH_2O$— units which when combined into a finished polymeric structure are only capable of affording water soluble polymers which have molecular weights rarely exceeding 5000.

Due to recent innnovation in catalysis as well as in manufacturing techniques, new high molecular weight ethylene oxide polymers are available which have molecular weights ranging from about 50,000 to in excess of 10,000,000. Surprisingly, these high molecular weight materials are soluble in water and form relatively stable solutions at temperatures below 100° C. Small amounts of these polymers will thicken water so that it becomes a very viscous mass. As evidence of the extreme thickening properties of these new high molecular weight ethylene oxide polymers, one commercial polymer has an average viscosity of 3,000 centipoises in a 1% aqueous solution. This particular material has a molecular weight of approximately 3,000,000. Another commercial polymer has an average viscosity, as a 1% water solution, of approximately 7,000 centipoises with its average molecular weight being about 6,000,000. Various techniques for producing the above type of polyethylene oxide polymers are set forth in an article by F. N. Hill et al., entitled "High Molecular Weight Polymers of Ethylene Oxide," appearing at pages 5–7 of volume 50, No. 1, January 1958 issue of Industrial and Engineering Chemistry. Particular reference is made to the paragraph entitled "Polymerization" on page 7 of this article.

Other ethylene oxide polymers of this type have molecular weights as low as 50,000 or molecular weights in excess of 10,000,000 or more. Although there is no arithmetical or geometrical correlation between viscosity and molecular weights of these polymers, it may be stated as a general rule that to achieve a given viscosity at a given solution strength, it will take more of the low molecular weight materials than of the higher molecular weight materials. That is to say that the centipoise viscosity of a .1% solution of a polyethylene oxide polymer having a molecular weight of 10,000,000 will be in substantial excess of the centipoise viscosity of a .1% solution of an ethylene oxide polymer having a molecular weight of about 50,000.

The polymers of ethylene oxide used in the invention are completely soluble in water up to the point where it is impossible to dissolve any more due to the extremes of viscosities achieved. These polymers tend to precipitate from aqueous solution at elevated temperatures around the boiling point of water. Surprisingly, all of the ethylene oxide polymers having molecular weights in excess of 50,000 become insensitive to precipitation if solutions thereof are below a temperature of about 100° C., this phenomena being experienced over the entire molecular weight range, as well as over a wide span of solution concentrations. Another interesting feature of the invention is that the polymers, particularly at the use concentrations which will be hereinafter specified, are relatively insensitive to the presence of electrolytes and other types of dissolved solids commonly found in the various white water systems. This is particularly important since it is sometimes the experience of the art that dissolved solids, particularly highly ionized dissolved solids, will tend to either precipitate or have adverse effects upon various types of polymers which have been either used or suggested as additives for white water saveall systems. Due to their high molecular weight the polymers of the invention are, no doubt, colloidally dispersed when they are in so-called "aqueous solution." Thus, for purposes of the present discussion, even though the word, "solution" or "dissolved" has been used, it will be understood that if the polymers are present as a colloidal suspension, such does not affect or limit in any way their operational activity when used in the practices described.

To utilize the high molecular weight ethylene oxide polymers of the invention, it is helpful if they are made up into dilute aqueous solutions which provides a convenient means for feeding the polymer into various white water saveall systems. Since even dilute solutions are relatively viscous and difficult to prepare and handle, it is expedient to prepare extremely dilute solutions, e.g., under 1% by weight, as feed concentrates. Under conditions of shear it has been observed that the polymers will tend to become less viscous. This evidences a loss in molecular weight. It is desirable, of course, that the molecular weight and viscosity of the polymers remain relatively constant until such time as they act upon the suspended matter in the white water in the saveall system. To this end, it is recommended for the most successful white water treatment the polymers be prepared in mixing devices which do not tend to impart shear to the polymers. It has been found that mechanical mixing and dissolving devices such as air eductors, air sparges, low shear mixers, and the like may be used satisfactorily in dissolving the polymers.

In many of the saveall type systems, particularly those of the flotation type, it has been observed that the polymers will undergo some degradation even when fed as dilute aqueous solution if subjected to certain types of high pressure or high vacuum pumping systems which employ impellers which impart substantial amounts of shear to aqueous fluids passing therethrough. These mechanical drawbacks are readily overcome by by-passing pumps which impart high shear to liquids and by employing simple feed pumps which do not tend to produce conditions of shear or high agitation to the polymer solutions.

One of the most startling features of the invention resides in the extremely low dosages at which the polymers tend to substantially improve saveall operations. This is particularly true in the case of flotation type saveall systems in which the polymers of the invention have shown their most startling and beneficial results. As a general rule, the white water may be treated with the polymers using as little as 0.01 p.p.m. up to as much as 25 p.p.m. with a general dosage range for most white waters being in the range of from between 0.01 p.p.m. up to 5 p.p.m. 2 p.p.m. will give good results in most instances.

It will be understood that the parts per million dosage ranges thus specified are in terms of the entire white water system rather than based upon the solids content of the white water system.

To more fully demonstrate the numerous advantages gained by the invention, the following example is presented by way of illustration, but not by way of limitation.

*Example*

The test situs was a 100% semi-chemical paper mill located in the North Central region of the United States. The particular stock being made into paper was unbleached furnish which was used to produce a corrugating medium sheet. Prior to the testing of the chemicals of the invention, the suspended solids of the saveall white water averaged between 11 to 15 pounds per 1,000 gallons. The pH of the white water was 7.5. The saveall used in this particular mill was a flotation type unit which is known to the trade as a Krofta flotator. This type unit is described in detail in the January 1960 issue of TAPPI, page 179A, et subs. During the normal operation of the mill without chemical treatment the effluent from the saveall averaged between 5 to 8 pounds per 1,000 gallons of suspended solids. The throughput of white water through the system was approximately 790 gallons per minute.

For purposes of comparing the chemicals of the present invention with the prior art, a test was run using 25 parts per million of hide glue. After running for ten hours on glue, evaluations were made and it was discovered that practically no improvement was made over the operational characteristics of the unit when it was run without any chemical additives.

A five-hour test was then set up to determine the efficiency of the high molecular weight ethylene oxide polymers. Two pounds of a high molecular weight ethylene oxide polymer having a molecular weight of approximately 7,000,000 was dissolved, under conditions of mild agitation, into 150 gallons of water which was contained in the chemical feed tank fitted with a small proportioning pump. The chemical in its dissolved state was metered into the white water influent to the flotator or the flotator itself with the dosage range being 1 p.p.m. During the test, a careful evaluation was made of the efficiency of the operation and it was noted that within a short period of time the throughput of the unit increased from the 790 gallons previously mentioned to 1300 gallons per minute. Effluent solids leaving the treated white water were less than two pounds per 1,000 gallons. Physical observations made of the floated stock which was at the top of the unit showed it to be much more compact and more readily removed.

The above example clearly indicates some of the more important benefits derived by practices of the invention. It shows that it enabled a vacuum type flotation unit to have an increased throughput. The flotation rate, e.g., that is the time required to produce a fibrous mass on the top of the unit, was substantially improved and the amount of suspended solids contained in the clarified white water had been dramatically diminished. Not only were these important benefits achieved but it is also important to remember there was a materially improved solids blanket at the top of the saveall unit.

Due to the extremely small dosage of the chemical required to effectively improve the operational characteristics of the saveall, it was not necessary to further treat the suspended solids removed from the system before they were recycled into the paper making operation. It was also observed that the white water which was relatively high in dissolved solids did not have a material effect upon the capability of the polymer to increase the flotation and removal rate of the suspended solids.

It is believed that the chemicals used in the process of the invention are capable of attaching the fibrous and other suspended matter in the white water to the air bubbles used in the flotation type saveall systems and, thereby, substantially increasing their rapid removal from the white water to the surface of the suspension where they may be readily removed in a more compact and uniform form. An important concept of the invention also resides in the fact that the polymers used are not affected by either the pH of the system or the particular charge upon the suspended particles contained in the white water systems, thereby allowing them to operate on a large variety of white water systems. This latter phenomenon is particularly surprising when it is considered that the high molecular weight ethylene oxide polymers described are not ionic and should not tend to attach to the suspended particles in the white water systems by known ionic forms of chemical bonding. Perhaps an explanation for their unique ability to operate in these systems is that of hydrogen bonding although this is offered only as a theory.

Having thus described my invention in all its useful and novel aspects, it is claimed as follows:

1. The method of improving the operational efficiency of flotation and vacuum type white water recovery systems whereby an increased amount of fibers and other solid materials are collected and removed from the white water, which comprises adding to the white water which has suspended therein said solid materials at least 0.01 p.p.m. of a water soluble ethylene oxide polymer which has an average molecular weight of at least 50,000, flowing said white water into a recovery system of said type and removing the thus treated suspended materials by means of said recovery system.

2. The method of improving the operational efficiency of a flotation type white water recovery system whereby an increased amount of fibers and other solid materials are collected and removed from the white water which comprises adding to the white water which has suspended therein said solid materials at least 0.01 p.p.m. of a water soluble ethylene oxide polymer which has an average molecular weight of at least 50,000, flowing said white water into said recovery system, causing air bubbles to be introduced in the water whereby said fibers and solid materials are caused to come to the white water surface and removing said fibers and other solid materials from said system.

3. The method of claim 1 where the average molecular weight of the water soluble ethylene oxide polymer is within the range of from between 50,000 and 10,000,000 or more and the dosage is within the range of from 0.01 to 25 p.p.m.

4. The method of claim 1 where the average molecular weight of the water soluble ethylene oxide polymer is within the range of between 3,000,000 to 6,000,000 and the dosage is within the range of from 0.01 to 5 p.p.m.

References Cited in the file of this patent

UNITED STATES PATENTS

| | | |
|---|---|---|
| 1,443,454 | Booth | Jan. 30, 1923 |
| 2,005,742 | Hines | June 25, 1935 |
| 2,347,147 | Booth | Apr. 18 1944 |
| 2,817,645 | Weisgerber | Dec. 24, 1957 |
| 2,942,978 | Segel et al. | June 28, 1960 |
| 2,980,609 | House et al. | Apr. 18, 1961 |
| 2,987,489 | Bailey et al. | June 6, 1961 |
| 3,020,229 | Thompson et al. | Feb. 6, 1962 |
| 3,020,230 | Smith | Feb. 6, 1962 |

FOREIGN PATENTS

| | | |
|---|---|---|
| 542,966 | Canada | July 2, 1957 |
| 1,213,798 | France | Nov. 2, 1959 |

OTHER REFERENCES

McGraw-Hill: "Pulp and Paper Manufacture," vol. 3, 1953, McGraw-Hill Book Co., New York, pages 34, 35.

Bailey et al.: "High Molecular Weight Polymers of Ethylene Oxide," Industrial and Engineering Chemistry, vol. 50, No. 1, January 1958, pages 8–11.